(No Model.)
H. T. CUSHMAN.
RUBBER ERASER.
No. 302,711. Patented July 29, 1884.
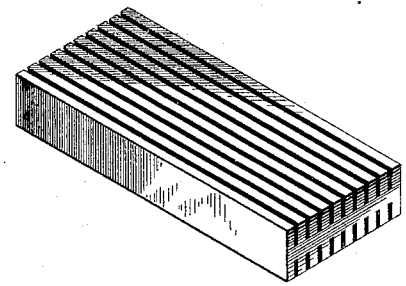

UNITED STATES PATENT OFFICE.

HENRY T. CUSHMAN, OF NORTH BENNINGTON, VERMONT.

RUBBER ERASER.

SPECIFICATION forming part of Letters Patent No. 302,711, dated July 29, 1884.

Application filed January 25, 1884. (No model.)

*To all whom it may concern:*

Be it known that I, HENRY T. CUSHMAN, of North Bennington, in the county of Bennington and State of Vermont, have invented certain improvements in Rubber Erasers, of which the following description, in connection with the accompanying drawing, constitutes a specification.

This invention consists in providing tablets of erasive rubber with slits or channels, the walls or sides of which shall not be in contact, as distinguished from slitted erasers in which the sides of the slits do come in contact or touch each other.

The drawing illustrates one modification of my invention, and shows a block of rubber having its opposite sides longitudinally grooved or channeled. These channels may be made in any direction and as numerous as the varying requirements of erasure may demand.

The advantages and new results accruing from a block thus prepared are that the whole tablet is rendered more pliable, elastic, and accommodating to the surface acted on with less pressure, and the open channels better facilitate the clearing away of the abraded detritus of lead-dust, rubber, and paper than ordinary erasive rubber does. This result follows from the fact that the channels, being open and free, afford unobstructed passage for lead-dust, abraded fiber, dirt, &c., which with other erasers is rubbed around and ground into the surface of the paper.

Hence I claim—

An erasive-rubber tablet having channels or grooves of which the sides are not in contact, substantially as described, and for the purposes set forth.

In testimony whereof I have hereto subscribed my name, at North Bennington, Vermont, this 22d day of January, A. D. 1884.

HENRY T. CUSHMAN.

In presence of—
FRANKLIN SCOTT,
EDW. D. WILTSIE.